April 6, 1943.　　　　C. H. WHITE　　　　2,315,752
PLANTER
Filed Oct. 31, 1940　　　　2 Sheets-Sheet 2
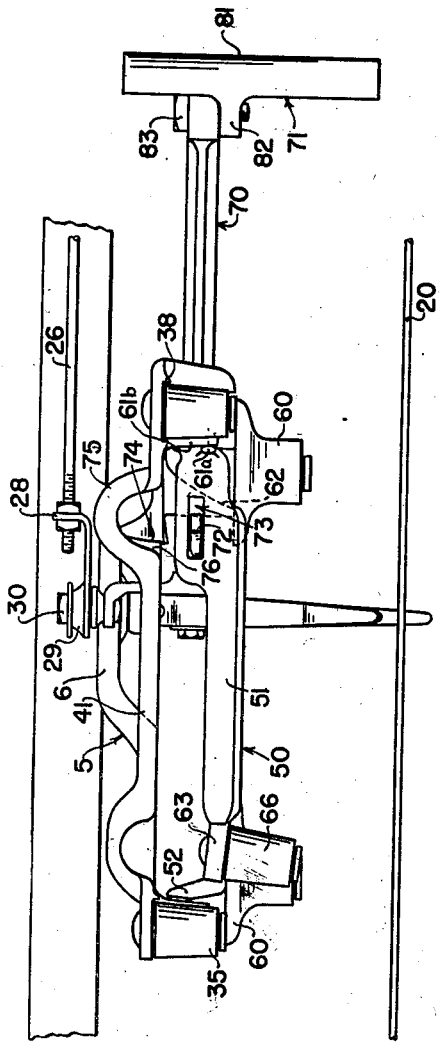
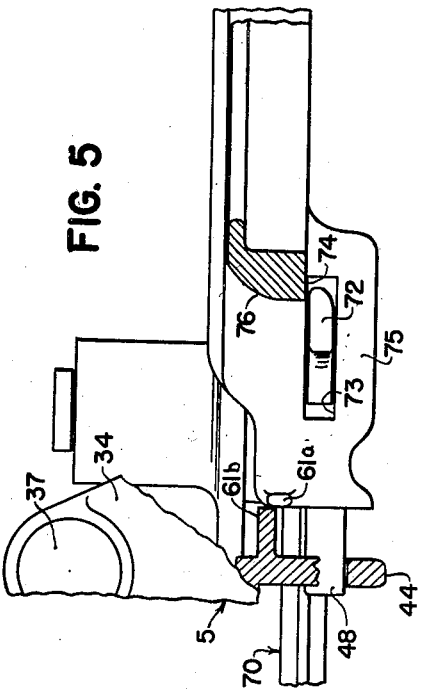
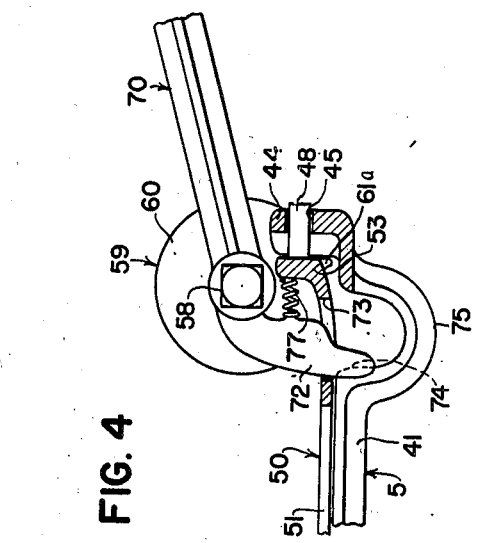
INVENTOR:
CHARLES H. WHITE
BY
ATTORNEYS.

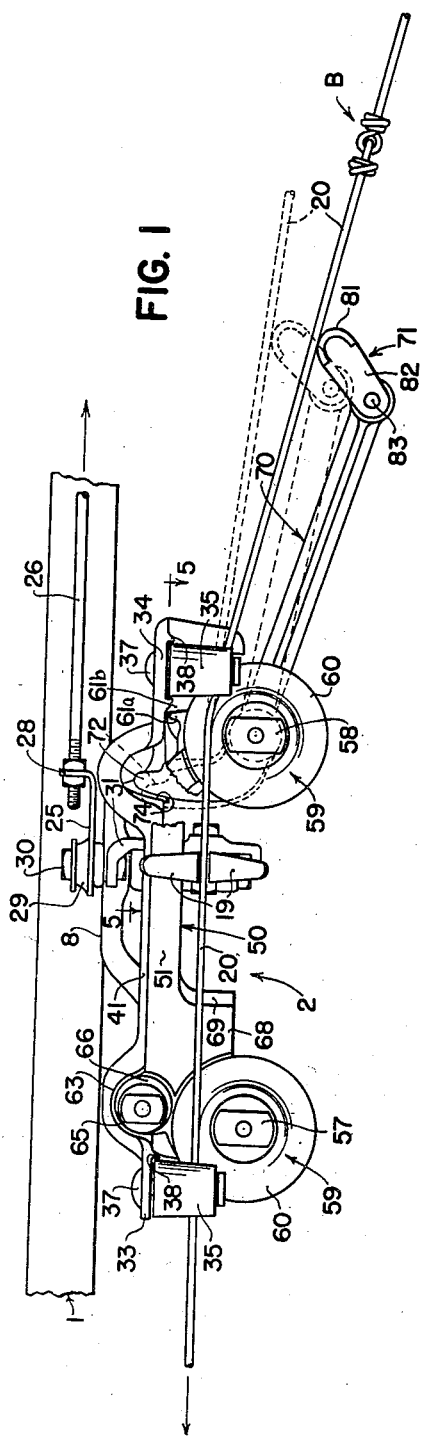
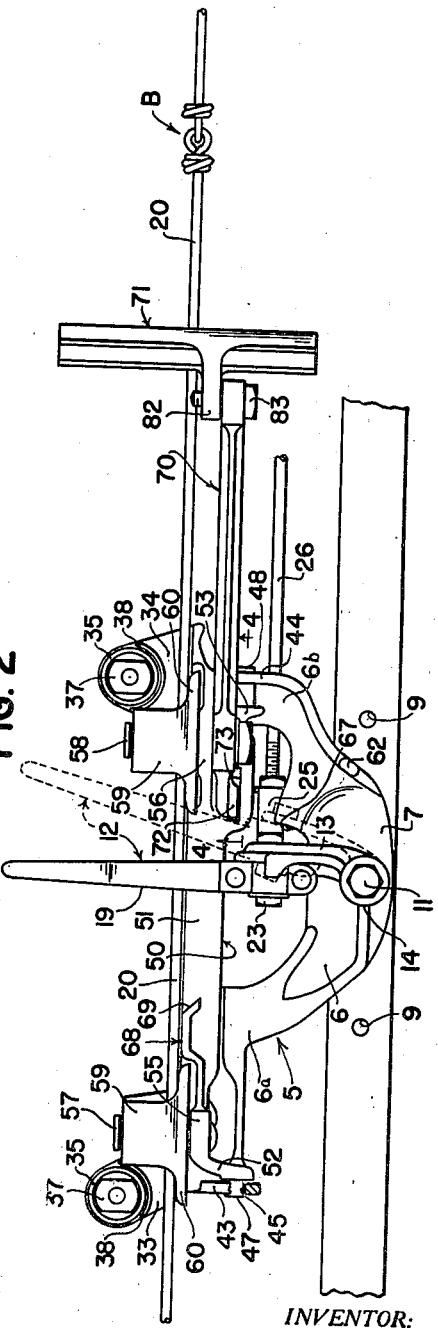

Patented Apr. 6, 1943

2,315,752

UNITED STATES PATENT OFFICE 2,315,752

PLANTER

Charles H. White, Moline, Ill., assignor to Deere & Company, Moline, Ill., a corporation of Illinois Application October 31, 1940, Serial No. 363,597

16 Claims. (Cl. 111—47)

The present invention relates generally to agricultural implements and more particularly to planting mechanism designed for use in check row planting. More particularly, the present invention relates to mechanism for doffing the check wire from the planter at the ends of the rows.

Heretofore, the operation of doffing the check wire at the end of the row has been performed either by mechanism on the planter responsive to actuation of some part thereof, such as the means for raising the planter runners out of operating position, or by the use of buttons or stops on the check wire itself.

The object and general nature of the present invention is the provision of a planter in which the check head is opened and the check wire released in response to the angle that the check wire makes with respect to the check head as the planter comes up to the end of the row. Specifically, it is a feature of the present invention to provide a check head construction in which the pivoted frame, which when closed normally holds the check wire in the proper position relative to the check fork, is latched in its closed position by means which is automatically opened when the angle that the check wire makes with respect to the check head reaches a given value. Still further, another feature of this invention is the provision of means whereby the angle of the check wire to which the doffing mechanism responds may be varied so as to plant as close as desired to the end of the row.

These and other objects and advantages of this invention will be apparent to those skilled in the art after a consideration of the following detailed description, taken in conjunction with the accompanying drawings, in which:

Figure 1 is a plan view of the preferred form of my invention, showing the check head in closed position, with the check wire extended at approximately the angle at which it opens the check head;

Figure 2 is a side elevational view of the check head construction shown in Figure 1;

Figure 3 is a plan view, similar to Figure 1, but showing the check head opened and the check wire released;

Figure 4 is an enlarged sectional view taken along the line 4—4 of Figure 2 and looking upwardly; and Figure 5 is an enlarged sectional view taken generally along the line 5—5 of Figure 1.

Referring now more particularly to Figures 1, 2 and 3, the frame of the planter on which the check head construction of the present invention is mounted, is indicated generally by the reference numeral 1. Inasmuch as the check row type of planting implement is old and well-known, I have not deemed it necessary to illustrate the same except to show the frame bar 1 on which the check head of the present invention is mounted. Actually, there are two check heads, one at each side of the planter, but since they are identical in construction, except one is a right hand unit and the other a left hand unit, a detailed disclosure of one is sufficient.

The check head, indicated in its entirety by the reference numeral 2, comprises a stationary frame 5 which preferably is in the form of a substantially U-shaped member 6 having a section 7 that is provided with a rib 8 which engages over the edge of the frame bar 1. The latter is provided with several openings 9, into one of which is disposed a fastening bolt 11 which serves two purposes. First, the bolt 11 serves to rigidly secure the stationary check head frame 5 to the planter frame, and second, the bolt 11 serves as a pivotal support for a check fork 12 which consists of a lower member 13 which includes a transverse bearing sleeve section 14 mounted for rocking movement on the bolt 11, and an upper fork member 19, the sides of the latter flaring upwardly and laterally outwardly, and spaced apart to receive the check wire 20 therebetween. The upper check fork member 19 is mounted for lateral rocking movement on a pivot stud 23 that is fixed in any suitable manner to the upper end of the lower check fork member 13. The latter member is provided with a link 25 which adjustably receives a rod 26 that is connected in the usual manner with the seed dropping valve mechanism (not shown) of the planter. Preferably, one end of the link 25 is bent laterally, as at 28, and is apertured to receive a rod 26, while the other end is formed with a bearing section 29 that is rockably supported on a bearing stud 30 carried by an extension 31 of the check fork member 13. The upper section 19 of the check fork 12 rocks laterally when the wire 20 is released from the check head.

The upper portion of the stationary check head frame 5 carries a pair of upwardly extending lugs 33 and 34 on which horizontally disposed guide rollers 35 are mounted for rotation. These spools or guide rollers 35 serve to retain the check wire 20 against upward displacement, as best shown in Figure 1. Preferably, each roller 35 is mounted on a stud 37 carried by the lugs 33, 34, and the latter have lower semi-circular flanges 38 formed so as to overlap the inner portions of the rollers 35 and thus preclude the possibility of the wire becoming wedged in between the roller and its lug support. The upwardly extending divergent arms 6a and 6b of the stationary frame 5 are cross connected by an upper web or bar 41 which is extended beyond the arms 6a and 6b (Figure 2) to form the spool supporting lugs 33 and 34. The extended portions of the upper web 41 are formed with a pair of laterally outwardly directed pivot lugs 43 and 44 which are apertured, as at 45 (Figures 2 and 4), to receive the trunnions 47 and 48 by which the movable frame, indicated in its entirety by the reference numeral 50, is swingably supported. The movable frame 50 is a part of the check head structure. The movable frame 50 is thus mounted for outward swinging movement and consists of a generally longitudinally extending bar 51 formed at its ends with lugs 52 and 53 which carry the trunnions 47 and 48. Other lugs 55 and 56 support pivot bolts 57 and 58 on which a pair of guide spools or rollers 59 are journaled on generally vertical axes when the swinging frame 50 is closed. Each of the spools or guide rollers 59 has a flange 60 at its lower end, and adjacent the pivot bolt 57, the swinging frame 50 is formed with another lug 63 adjacent the rear spool or guide roller 59. The lug 63 carries a stud or pivot bolt 65 on which a roller 66 is journaled. The pivot 65 is so disposed, as best shown in Figure 1, that the roller 66 is in a position slightly forward of the pivot 57, so that the roller 66 not only serves to prevent the check wire 20 from riding off of the flange 60, as best shown in Figure 1, but also, when the check head is open, permits the wire to be reengaged with the swinging frame and contact the roller 66, whereby, with a quick jerk upwardly, the wire itself can be used to close the check head. Normally, the check fork 12 is held by suitable means (not shown) in its forward position (dotted lines, Figure 2) with the lower member 13 against a stop lug 67 on the frame 5, and adjacent the pivot studs 57 and 65 (Figure 1) the swinging check head frame 50 is provided with a shelf or abutment section 68 which serves as a stop for the rearward swinging movement of the check fork 12, the abutment edge 69 of the stop 68 being beveled, as best shown in Figure 2, to receive the check fork section 19.

The end of the swinging frame 50 adjacent the trunnion 48 (Figures 2 and 4) is formed with a shoulder 61a which engages the edge of a projection 61b formed on the forward portion of the stationary frame 5, both when the check head is closed, as in Figure 1, and open, as in Figure 3. This maintains the two frames in the proper relative positions. Also, the arm 6b (Figure 2) of the stationary frame 5 has a laterally outwardly extending lug or stop 62 against which the forward spool 60 bears when the check head is open, as shown in Figure 3.

The present invention is largely concerned with mechanism for controlling the release of the swinging check head to permit the wire to disengage from the check head structure. As best shown in Figure 4, which is a section looking upwardly along the line 4—4 of Figure 2, the web 51 of the swinging check head frame 50 is disposed inside of the pivot axis defined by the trunnions 47 and 48. Mounted for rocking movement in a generally horizontal plane on the lower end of the pivot member 58 is a latch arm 70 which includes an adjustable wire engaging member 71 and an inner latch end 72 that extends through a slot 73 in the adjacent portion of the web 51 and underneath a shoulder 74 on the stationary check head frame 5. The shoulder 74 is formed adjacent a looped portion 75, and the upper part of the shoulder 74 is beveled, as at 76 in Figures 3 and 5. The shoulder 74 on the stationary frame serves as a keeper which the latch 72 engages whereby the swinging frame is locked in operating position. In full lines in Figure 1, the latch arm 70 is shown in the position it occupies at the moment the swinging frame 50 is released, and the dotted line position of the arm 70 in Figure 1 shows the fully latched position of the arm. A spring 77 (Figure 4) is disposed between the latch 72 and an adjacent part of the swinging frame 50. The spring 77 biases the arm 70 for movement into its fully latched position, as shown in Figure 4 and in dotted lines in Figure 1.

The member 71 that is engaged in operation by the check wire 70 comprises a generally vertically disposed part having a curved forward surface 81 and a rear lug 82 which is apertured and threaded to receive a cap screw 83 which adjustably fixes the wire contacting member 71 in position on the outer end of the latch arm 70.

The operation of the check head structure described above is substantially as follows.

In normal operation with the check head closed and the wire passing therethrough in between the two parts 19 of the check fork 12, the buttons B of the wire 20 (Figure 1) will periodically engage the check fork 12 and rock the same rearwardly, exerting a pull through the link 26 to actuate the rocker shaft (not shown) of the planter. As the planter approaches the end of the field the forward portion of the wire 20 ahead of the planter makes an increasing angle with respect to the check head, since the check wire stake ahead of the planter toward which it is approaching is offset to one side, as will be readily understood by those familiar with check row planting. Finally, as the planter nears the end of the row the angle that the wire makes with respect to the check head and the line of travel becomes great enough to move the latch arm 70 from its dotted line position in Figure 1 to its full line position, whereupon the latch 72 will be disengaged from the keeper shoulder 74. Immediately the tension of the wire acting against the swinging frame unit and above the pivot axis defined by the trunnions 47, 48 (Figure 2) will swing the frame open, releasing the check wire. In this action the check fork 12 pivots on the stud 23. From Figure 1 it will be seen that the position of the wire engaging member 71 may be adjusted so that the check head is opened at the proper point, that is, by adjusting the member 71 more or less angle in the wire will be required to release the latch and permit the swinging check head frame to open. After the planter has been turned around at the end of the field and the stake moved to its new position, the wire 20 may be reengaged with the check head structure merely by swinging the wire into the two arms 19 and at the same time moving the wire upwardly and laterally so as to swing the frame 50 back into its engaged position, which will then lock the wire in operating position between the guide spools. The tapered surface 76 of the keeper shoulder 74 permits the latch 72 to ride over into position underneath the keeper 74, whereupon the spring 77 moves the keeper into latched position. It is to be noted that the energy for swinging the release arm 70 is derived from the tension in the wire. Normally, the check wire will be released at about the ninth button from the end, but this may be varied, as desired, by adjusting the position of the member 71 on the end of the release arm 70.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a releasable check-head, a check wire cooperating with said check-head, and means responsive to a change in the angular position of the wire relative to the check-head for releasing the latter.

2. The combination with a planting implement comprising a check-head and a check row wire cooperating therewith, of means responsive to the angular position of the wire as it approaches the check-head for releasing the wire therefrom.

3. In a planter, the combination of a check-head having releasable means for holding a check-wire in operative position relative thereto, and means adapted to be engaged by the check-wire when it is disposed at a certain angle relative to said check-head for releasing said holding means.

4. In a planter, the combination of a check-head comprising a stationary frame and a movable frame adapted to receive a check-wire therebetween, latch means for holding said frames in operative association, a tripping member for operating said latch means to release said movable frame, and means on said tripping member normally out of the path of movement of said wire but disposed at one side thereof but sufficiently closely adjacent thereto so as to release said latch means and disengage the check-row wire from said check-head whenever the wire is caused to extend in a generally horizontal plane from the check-head at an angle sufficient to cause the wire to engage and move said tripping member.

5. In a planter, a check-head comprising a stationary frame and a movable frame adapted to receive a check-wire therebetween, means including an arm having a section disposed laterally outwardly of the check-wire and engageable with the wire when the same makes a predetermined angle in a generally horizontal plane with respect to the check-head for releasing said movable frame, and means for adjusting the lateral position of said section whereby the angle at which the check-wire is released may be adjusted to accommodate different row spacings.

6. In a planter, a check-head including a stationary frame and a frame movably connected with the stationary frame, said frames being adapted to receive a check-wire therebetween, a latch for holding said frames in position closed about said check-wire, and an arm connected with said latch and having a generally vertically extending section normally disposed laterally outwardly of the wire so as to be adapted to be engaged by said check-wire in various vertical positions of the check-wire.

7. In a planter, a check-head comprising a stationary frame and a movable frame adapted to receive a check-wire therebetween, means including releasable latch means for holding said frames in engagement, an arm for controlling said latch means having a section disposed laterally outwardly of the check-wire and engageable with the wire when the same makes a predetermined angle with respect to the check-head for releasing said latch means to permit the movable frame to move away from the stationary frame, and means supporting said latch and arm on said movable frame, whereby said arm moves out of the way of the check-wire when the latter is released.

8. In a planter, a check-head comprising separable parts and adapted to receive a check-wire therebetween, latch means for releasably holding said parts together to confine the wire therebetween, and means responsive to the angle at which said wire approaches the check-head for releasing said latch.

9. In a planter, a check-head comprising separable parts and adapted to receive a check-wire therebetween, latch means for releasably holding said parts together to confine the wire therebetween, means responsive to the angle at which said wire approaches the check-head for releasing said latch and provide for one part moving away from the other, and spaced means on said one part for receiving said wire therebetween to provide for closing said one part relative to the other by manipulating said wire.

10. In a planter having a check-head adapted to receive a check-row wire, an arm mounted for lateral movement relative to said check-head and adapted to be engaged by said wire, and releasing means actuated by said arm, whereby the wire will be released when it extends at a given angle from the check-head.

11. In a check-row planter using a check-wire, the combination of a releasable check-head adapted to receive said check-wire, a movable arm disposed laterally outwardly of said wire to be operated by the wire when it enters said check-head at a predetermined angle, and means whereby said arm controls the release of said check-head in response to a change in the angle at which the check-wire approaches the check-head.

12. The invention as defined in claim 11, further characterized by said arm having a wire-engaging section adjustable relative to said arm so as to vary the check-wire angle at which the check-wire will be released.

13. The combination with a planting implement comprising a check-head and a check row wire cooperating therewith, of a movable part disposed laterally outwardly of said wire to be engaged and moved thereby when the wire approaches the check-head at a certain angle, and means whereby movement of said movable part doffs said wire.

14. In a planter, a check-head comprising separable parts and adapted to receive a check-wire therebetween, latch means for releasably holding said parts together to confine the wire therebetween and providing for one part moving away from the other when the latch means is released, said latch means being formed so that one of said parts is freely movable into closed position relative to the other part, and means on said one part for receiving said wire to provide for closing said one part relative to the other by manipulating said wire.

15. In a planter, a check-head comprising a stationary frame and a movable frame adapted to receive a check-wire therebetween, a latch arm mounted on the movable frame for movement therewith and pivoted for swinging movement relative thereto, a nose on the latch arm engageable under a portion of the stationary frame for holding said frames locked together, and a part on the outer end of the arm disposed laterally outwardly of the check wire but adapted to be engaged thereby when the check wire approaches the check-head at a certain angle horizontally, whereby an increase in said angle causes said wire to bear against said part and cause the arm to disengage said nose from the stationary frame and release the movable frame.

16. A check-head as defined in claim 15, further characterized by said part extending vertically, when the frames are locked, and pivoted to said arm for movement into different positions of lateral adjustment.

CHARLES H. WHITE.